Feb. 23, 1960 — R. W. GEORGE — 2,926,315

ELECTROMECHANICAL FILTER

Filed Aug. 27, 1956

INVENTOR.
RALPH W. GEORGE
BY
Charles H. Brown
ATTORNEY

United States Patent Office 2,926,315
Patented Feb. 23, 1960

2,926,315

ELECTROMECHANICAL FILTER

Ralph W. George, Princeton, N.J., assignor to Radio Corporation of America, a corporation of Delaware Application August 27, 1956, Serial No. 606,273

The terminal fifteen years of the term of the patent to be granted has been disclaimed 2 Claims. (Cl. 333—71)

The invention relates to electromechanical filters, and particularly to electromechanical filters designed to operate in a concentric shear mode of vibration.

An object of the invention is to provide an improved electromechanical filter that operates in the concentric shear mode of vibration.

Another object of the invention is to provide an electromechanical filter which is capable of operating in the concentric shear mode of vibration and which is compact and relatively inexpensive to manufacture.

Another object of the invention is to provide a bandpass electromechanical filter that vibrates in the concentric shear mode, that has a broadband electrical termination, and that has a low electrical transmission loss.

Still another object of the invention is to provide an improved, compact bandpass electromechanical filter capable of use in the intermediate frequency stages of a broadcast receiver for passing frequencies of the order of 455 kilocycles.

The electromechanical filter of the invention comprises at least one magnetostrictive disc shaped resonator which is magnetically biased with a circular magnetic field about its longitudinal axis. Input means are coupled to the resonator for producing a radial magnetic field in the resonator in response to electrical signals, thus causing the resonator to vibrate in the concentric shear mode. Output means similar to the input means may also be coupled to the resonator for detecting the concentric shear vibrations. Electrical signals applied to the input means are filtered according to the characteristics of the resonator, and may be detected at the output means. The characteristics of the filter may be changed by using several resonators, and by using different amounts of mechanical couplings between the resonators.

The invention is explained in detail in connection with the accompanying drawing, in which.

Figure 1:
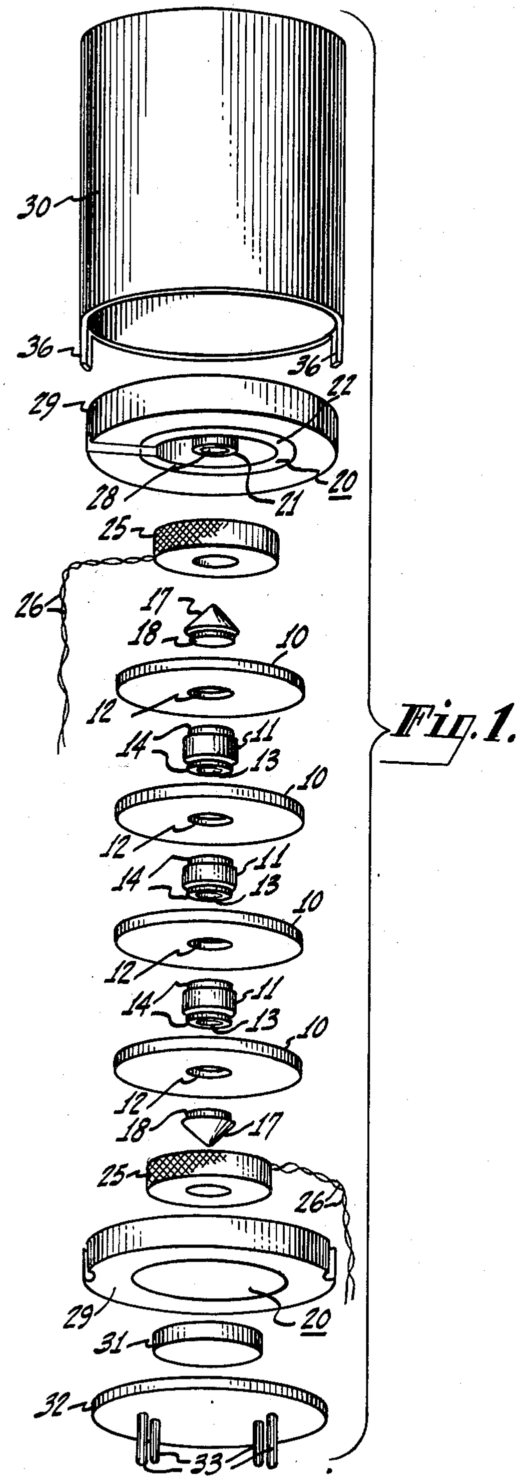
Fig. 1 shows an exploded view, in perspective, of the components used in one embodiment of a filter constructed in accordance with the invention.

Fig. 1 shows an exploded view, in perspective, of the components used in one embodiment of a filter constructed in accordance with the invention. The filter comprises a mechanical filter portion, input and output portions, and a housing portion. The filter portion includes a plurality of disc shaped resonators 10, and a plurality of cylindrically shaped couplers 11. The resonators 10 are made from some magnetostrictive material such as ferrite, and the couplers 11 are made of some material having low mechanical losses. One such material which has been used is duraluminum. Each of the resonators 10 has a circular hole 12 thru its center for positioning the couplers 11 when the filter portion is assembled, and for permitting the resonators 10 to be magnetically biased. Each of the couplers 11 may be solid, or may have a circular hole 13 through its center. The size of the hole 13, or the outer diameter of the couplers 11, or the length of the couplers 11, or all three, may be varied to vary the amount of coupling required between the resonators 10. However, it is preferable that the effective length of the coupler 11 between surfaces of adjacent resonators 10 be an odd multiple, including unity, of a quarter wavelength in the torsional mode at the midband frequency of the filter. One quarter wavelength is preferred, as it provides a compact assembly. A positioning shoulder 14 of smaller diameter than the outer diameter of the coupler 11 may be provided at both ends of the coupler 11 to facilitate assembly of the resonators 10 and the couplers 11. The shoulders 14 are designed to fit in the holes 12 of the resonators 10. Two conically shaped pivots 17, made of some material having low mechanical losses and low eddy current losses, are provided for mounting the filter portion. One such material which has been used with satisfactory results is Lucite. However, a material such as quartz is highly satisfactory. Each of the pivots 17 may also have a positioning shoulder 18 to facilitate assembly of the pivots 17 and the resonators 10.

The input and output portions of the filter include input and output cores 20 which are made of some magnetic material such as ferrite. Each of the cores 20 comprises concentric, annular pole pieces 21, 22 which are designed to hold the input and output coils 25 respectively, and which tend to improve the coupling between each of the coils 25 and its respective adjacent resonator 10. The pole pieces 21, 22 may be integral with their respective cores 20 to facilitate handling the cores 20 and assembling them with the other components. The diameter of each of the cores 20 is preferably smaller than the diameter of the resonators 10 so that each of the input and output coils 25 is coupled to the inner portion of its respective resonator 10. This arrangement makes it possible to terminate the filter properly with relatively broadband tuned electrical circuits. The coils 25 terminate in leads 26, and are designed to fit concentrically between the pole pieces 21, 22 of their respective cores 20. The inner pole piece 21 of each core 20 has a conically shaped hole or depression 28, which may be glazed, to provide a suitable bearing surface for the pivots 17. Since the cores 20 are of smaller diameter than the resonators 10, annular spacers 29, made of some non-magnetic material, are placed around each of the cores 20 to ensure that the cores 20 are positioned properly when the filter is assembled in a can 30. The housing portion of the filter includes the cylindrically-shaped metallic can 30, a spacer insulating disc 31, and a terminal insulating disc 32. The terminal disc 32 has a diameter just small enough to fit snugly in the can 30. The terminal disc 32 has a pair of input and a pair of output metallic terminals 33 which are insulated by the terminal disc 32 from the can 30 and the core 20 to provide external connections for input and output coils 25 of the filter.

Figure 2:
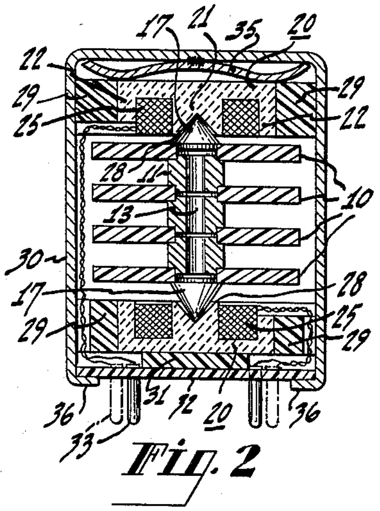
Fig. 2 shows a cross sectional view of an assembled filter having the components shown in Fig. 1.

Fig. 2 shows a cross sectional view of the filter after the components shown in Fig. 1 have been assembled. In the assembly, a spring 35 is first fastened to the closed end of the can 30 to provide suitable pressure to hold the components in place. Then, one of the cores 20 with its annular spacer 29 and coil 25 is positioned on the spring 35 so that the conical depression 28 can receive the pivot 17 on the filter portion. The filter portion, including the resonators 10, couplers 11, and the pivots 17 are all assembled as a unit using any suitable means, such as cement. The assembled filter portion is placed in the can 30 so that one of the pivots 17 fits into the conical depression 28. The other core 20 with its annular spacer 29 and coil 25 are then placed in the can 30 so that the bearing depression 28 of the other core 20 is positioned over the other pivot 17. The leads 26 of the coils are brought out thru suitable notches in the cores 20 and annular spacers 29, and connected to respective terminals 33 on the terminal disc 32. The spacer disc 31 is then placed on the core 20 to provide suitable clearance for the terminals 33, and finally the terminal disc 32 is placed on the spacer disc 31. Suitable means, such as the projecting lugs or tabs 36 shown, are provided for holding the assembled components in position and under the proper amount of pressure. When the components are assembled in the can 30, they are symmetrically positioned about a common longitudinal axis.

Figure 3:
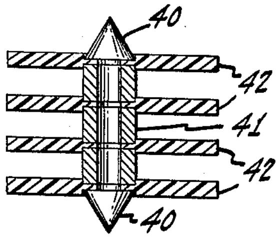
Fig. 3 shows a cross sectional view of a variation in construction of the mechanical filter portion of the invention.

Each of the resonators 10 shown in Figs. 1 and 2 has a small hole 12 passing thru the entire thickness of the resonator. This arrangement facilitates positioning and fastening the couplers 11 at the center of the resonators 10. However, this arrangement requires that each of the couplers 11 be provided with a small shoulder 14 at each end. Fig. 3 shows a variation in construction of the mechanical filter portion of the invention. This variation utilizes conically shaped pivots 40 and cylindrically shaped couplers 41, both of which have no shoulders. Each of the resonators 42 is provided with a concentric, circular indent or depression on each side to fit and position the pivots 40 and the couplers 41. These depressions extend into the thickness of the resonators 42 just far enough so that the pivots 40 and couplers 41 are easily and accurately positioned in place.

The filter constructed in accordance with the invention operates in the concentric shear mode. When the filter is operating in this mode, the resonators vibrate concentrically about one or more concentric, circular nodes. At any one instant during vibration, the portion of the resonator on one side of the node vibrates in one circular direction, for example clockwise, while the portion of the resonator on the other side of the node vibrates in the other circular direction, which in the same example would be counterclockwise. When a resonator is vibrating at its fundamental frequency, only one concentric, circular node is present. This fundamental frequency is principally determined by the diameter of the resonator, although putting the hole thru its center does have a slight effect on this fundamental frequency. The concentric shear mode of vibration may be set up in one of the end resonators 10 by biasing the resonator with a circular magnetic field, and by exciting the resonator with an alternating current signal which produces a radial magnetic field in the resonator so biased. The combination of the circular magnetic field and the radial magnetic field in the resonator produces the concentric shear vibrations just described. The resonator may be magnetically biased with a residual, circular magnetic field produced by momentarily passing direct current thru a wire which passes thru the hole 12 in the center of the resonator. Once the resonator is biased, the wire may be removed. As previously mentioned, this same hole 12 also provides convenient means to position the couplers 11. The resonator serving as the input resonator may be excited with a radial magnetic field produced by an input signal applied to the coil 25 serving as the input coil. The magnetic field set up by a current flow thru the coil serving as the input coil extends radially between the concentric inner and outer pole pieces 21, 22 of the core 20 serving as the input core, and passes thru a portion of the adjacent input resonator 10 in the same radial manner. The resultant concentric shear vibrations set up in the input resonator cause the adjacent coupler to vibrate in a torsional mode, and these torsional vibrations set up concentric shear vibrations in the next resonator, and so on thru all the couplers and resonators. The last resonator serving as output resonator has a residual circular magnetic bias, and when it vibrates in the concentric shear mode, it produces corresponding electrical currents in the output coil coupled to it with the aid of the output core. The output signal is derived from the output coil. While only the input and output resonators need be made of a magnetostrictive material, it may be more convenient to make all of the resonators of the same magnetostrictive material so that they have uniform dimensions and characteristics. Likewise, only the input and output resonators need to be magnetically biased.

While only two embodiments of the filter portion according to the invention have been shown, and while only one embodiment of mounting the filter portion has been shown, other mechanical configurations and arrangements may be used. For example, the filter portion may be supported by means of pivots which are integral with the inner pole pieces of the cores. The filter may be provided with broadband terminations by using electrical damping in which electrical resistance in the tuned input and output circuits is electromechanically converted into mechanical damping by means of the magnetostrictive coupling between the coils and their respective input and output resonators. Broadband electrical terminations requires that the electromechanical coupling coefficient between each coil and its respective resonator be relatively large, and that the magnetostrictively energized portion of each resonator be relatively small. When electrical damping is used to terminate the filter, the input and output circuits are preferably tuned. This may be accomplished by the addition of suitable capacitance connected across the input and output coils. The electrical resistance in each of the tuned input and output circuits may be obtained by known means such as an electrical resistor having a value which, when added to the electrical resistance already present in the tuned circuits, provides the desired electrical damping or Q. Where it is desired to transmit as much power as possible thru the filter (i.e., where the electrical transmission losses thru the filter are to be minimized), as much of the electrical damping as possible should be in terminal load resistances of the filter which are separate from the electrical resistance already present in the tuned circuits.

A filter constructed in accordance with the invention is relatively easy to construct, is very compact, and may be produced cheaply and in large quantities. In one embodiment successfully constructed in accordance with the invention, the filter portion comprised four resonators made of magnetostrictive ferrite. Each resonator had a diameter of 0.507 inch and a thickness of 0.060 inch. The diameter of the hole was 0.077 inch. The two end or outer couplers were made of duraluminum, and had an inside diameter of 0.058 inch, an outside diameter of 0.10 inch, and a length of 0.064 inch not including the shoulder. The interior couplers were similar in all respects except the outside diameter, which was 0.095 inch. When mounted and excited, this filter provided a bandwidth of approximately 9.5 kilocycles at a center frequency of 453.5 kilocycles. The entire filter assembly was mounted in a can having a diameter of ⅝ inch, and a length of 1 inch. More or fewer resonators could be used, depending upon the degree of selectivity required. The bandwidth could be changed by changing the mass of the couplers, or the resonators, or both.

The invention claimed is:

1. An electromechanical filter comprising a plurality of similar disc shaped resonators each having a diameter substantially greater than their thickness, cylindrically shaped metallic couplers having a length of one quarter wavelength in torsion at the midband frequency of said filter and having a smaller diameter than said resonator diameter, means connecting said couplers between said resonators to form a series of alternate resonators and couplers symmetrically positioned along a common longitudinal axis, said couplers being constructed and arranged to transfer concentric shear mode vibrations between adjacent resonators, said series beginning with an input resonator that is magnetostrictive and that has at least a portion thereof permanently biased by a substantially circular magnetic field about said longitudinal axis and said series ending with an output resonator that is magnetostrictive and that has at least a portion thereof permanently biased by a substantially circular magnetic field about said longitudinal axis, said input resonator and said output resonator each having a conically shaped pivot fastened thereto, said pivots being symmetrically positioned about said longitudinal axis, a pair of concentric annular input pole pieces positioned symmetrically about said longitudinal axis near the outer surfaces of said input resonator, the outer pole piece of said pair of input pole pieces having a diameter smaller than said resonator diameter, the inner pole piece of said pair of input pole pieces having a conically shaped bearing depression adapted to receive said pivot fastened to said input resonator to provide pivotal cooperation with said bearing depression in said input pole piece, said depression being symmetrically positioned about said longitudinal axis, an annular input coil positioned between said input poie pieces for producing a radial magnetic field in a portion of said input resonator and causing said input resonator to vibrate in a concentric shear mode in response to electrical signals applied to said input coil, a pair of concentric annular output pole pieces positioned symmetrically about said longitudinal axis near the outer surface of said output resonator, the outer pole piece of said pair of output pole pieces having a diameter smaller than said resonator diameter, the inner pole piece of said pair of output pole pieces having a conically shaped bearing depression adapted to receive said pivot to provide pivotal cooperation with said bearing depression in said output pole piece, said last named depression being symmetrically positioned about said longitudinal axis, and an annular output coil positioned between said output pole pieces for detecting concentric shear vibrations in said output resonator and producing electrical signals in response thereto.

2. An electromechanical filter comprising a plurality of similar magnetostrictive disc shaped resonators having a diameter substantially greater than their thickness and having a concentric circular opening therethru, cylindrically shaped metallic couplers having a length of one-quarter wavelength in torsion at the midband frequency of said filter, said couplers having a smaller diameter than said resonator diameter and having a shoulder at each end thereof that has a smaller diameter than said coupler diameter, and said couplers being constructed and arranged to transfer concentric shear mode vibrations between adjacent resonators, means coupling said shoulders of said couplers into said openings of said resonators to form a series of alternate resonators and couplers symmetrically positioned along a common longitudinal axis, said series beginning with an input resonator having at least a portion thereof permanently biased by a substantially circular magnetic field about said longitudinal axis and said series ending with an output resonator having at least a portion thereof permanently biased by a substantially circular magnetic field about said longitudinal axis, said input resonator and said output resonator each having a conically shaped pivot fastened thereto, said pivots being symmetrically positioned about said longitudinal axis, a pair of concentric annular input pole pieces positioned symmetrically about said longitudinal axis near said input resonator, the outer pole piece of said pair of input pole pieces having a diameter smaller than said resonator diameter, the inner pole piece of said pair of input pole pieces having a conically shaped bearing depression adapted to receive said pivot fastened to said input resonator to provide pivotal cooperation with said bearing depression in said input pole piece, said depression being symmetrically positioned about said longitudinal axis, an annular input coil positioned between said input pole pieces for producing a radial magnetic field in a portion of said input resonator and causing said input resonator to vibrate in a concentric shear mode in response to electrical signals applied to said input coil, a pair of concentric annular output pole pieces positioned symmetrically about said longitudinal axis near said output resonator, the outer pole piece of said pair of output pole pieces having a diameter smaller than said resonator diameter, the inner pole piece of said pair of output pole pieces having a conically shaped bearing depression adapted to receive said pivot to provide pivotal cooperation with said bearing depression in said output pole piece, said last named depression being symmetrically positioned about said longitudinal axis, and an annular output coil positioned between said output pole pieces for detecting concentric shear vibrations in said output resonator and producing electrical signals in response thereto.

References Cited in the file of this patent

UNITED STATES PATENTS

| | | |
|---|---|---|
| 2,435,487 | Adler | Feb. 3, 1948 |
| 2,501,488 | Adler | Mar. 21, 1950 |
| 2,578,452 | Roberts | Dec. 11, 1951 |
| 2,696,590 | Roberts | Dec. 7, 1954 |
| 2,810,889 | Lundgren | Oct. 22, 1957 |

OTHER REFERENCES

Roberts (II): QST, vol. 37, No. 6, June 1953, pages 24–27.

Roberts (III): QST, vol. 37, No. 7, July 1953, pages 28–30, 112, 114.